US008588252B2

(12) United States Patent
Montojo et al.

(10) Patent No.: US 8,588,252 B2
(45) Date of Patent: Nov. 19, 2013

(54) TRANSMISSION OF CONTROL INFORMATION ON UPLINK CHANNELS

(75) Inventors: Juan Montojo, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 13/102,005

(22) Filed: May 5, 2011

(65) Prior Publication Data

US 2012/0113832 A1    May 10, 2012

Related U.S. Application Data

(60) Provisional application No. 61/332,598, filed on May 7, 2010.

(51) Int. Cl.
    *H04J 3/16*    (2006.01)
(52) U.S. Cl.
    USPC .......................................... 370/471; 370/468
(58) Field of Classification Search
    USPC ......... 370/329, 349, 322, 330, 341, 348, 431, 370/436, 471, 468
    See application file for complete search history.

(56) References Cited

U.S. PATENT DOCUMENTS

2008/0095106 A1*    4/2008    Malladi et al. ................ 370/329
2010/0098012 A1    4/2010    Bala et al.

FOREIGN PATENT DOCUMENTS

WO    WO2010148319 A1    12/2010

OTHER PUBLICATIONS

Sharp: "UCI reporting considerations for multiple component carrier transmission for LTE-Advanced", 3GPP Draft; RI-102394, 3rd Generation Partnership Project (3GPP), Mobile Competence Centre ; 650, Route Des Lucioles ; F-06921 Sophia-Antipolis Cedex ; France, vol. RAN WGI, no. Beijing, china; Apr. 12, 2010, Apr. 6, 2010, XP050419613.
Alcatel-Lucent et al: "Power scaling method for maximum power", 3GPP Draft; R1-102784 JJL PC Power Scaling Final, 3rd Generation Partnership Project (3GPP), Mobile Competence Centre ; 650, Route Des Lucioles ; F-06921 Sophia-Antipolis Cedex ; France, vol. RAN WGI, no. Montreal, Canada; May 10, 2010, May 4, 2010, XP050419961.
International Search Report and Written Opinion—PCT/US2011/035632, International Search Authority—European Patent Office—Sep. 27, 2011.

(Continued)

*Primary Examiner* — Brenda H Pham
(74) *Attorney, Agent, or Firm* — Steven A. Raney

(57) ABSTRACT

Techniques for sending control information on uplink channels are disclosed. In one design, a user equipment (UE) may determine its current configuration for concurrent transmission of a control channel and a shared channel. The UE may select one or more channels, from among the control channel and the shared channel, to send control information of at least one type in a same subframe. The UE may select the one or more channels based on the types of control information to send, the current configuration for concurrent transmission of the control channel and the shared channel, whether the UE is scheduled for data transmission on the shared channel in the subframe, whether the UE has sufficient transmit power to transmit both the control channel and the shared channel, etc. The UE may send the control information on the one or more selected channels in the subframe.

28 Claims, 9 Drawing Sheets

(56) References Cited

OTHER PUBLICATIONS

Qualcomm Incorporated: "Non SC-FDM Transmission in UL of LTE-A", 3GPP Draft; RI-102328 Non SC-FDM TXMN, 3rd Generation Partnership Project (3GPP), Mobile Competence Centre; 650, Route Des Lucioles; F-06921 Sophia-Antipolis Cedex; France, vol. RAN WGI, no. Beijing, china; Apr. 12, 2010, Apr. 6, 2010, XP050419560.

F-06921 Sophia-Antipolis Cedex; France, vol. RAN WGI, no. Beijing, china; Apr. 12, 2010, Apr. 6, 2010, XP050419613.

* cited by examiner

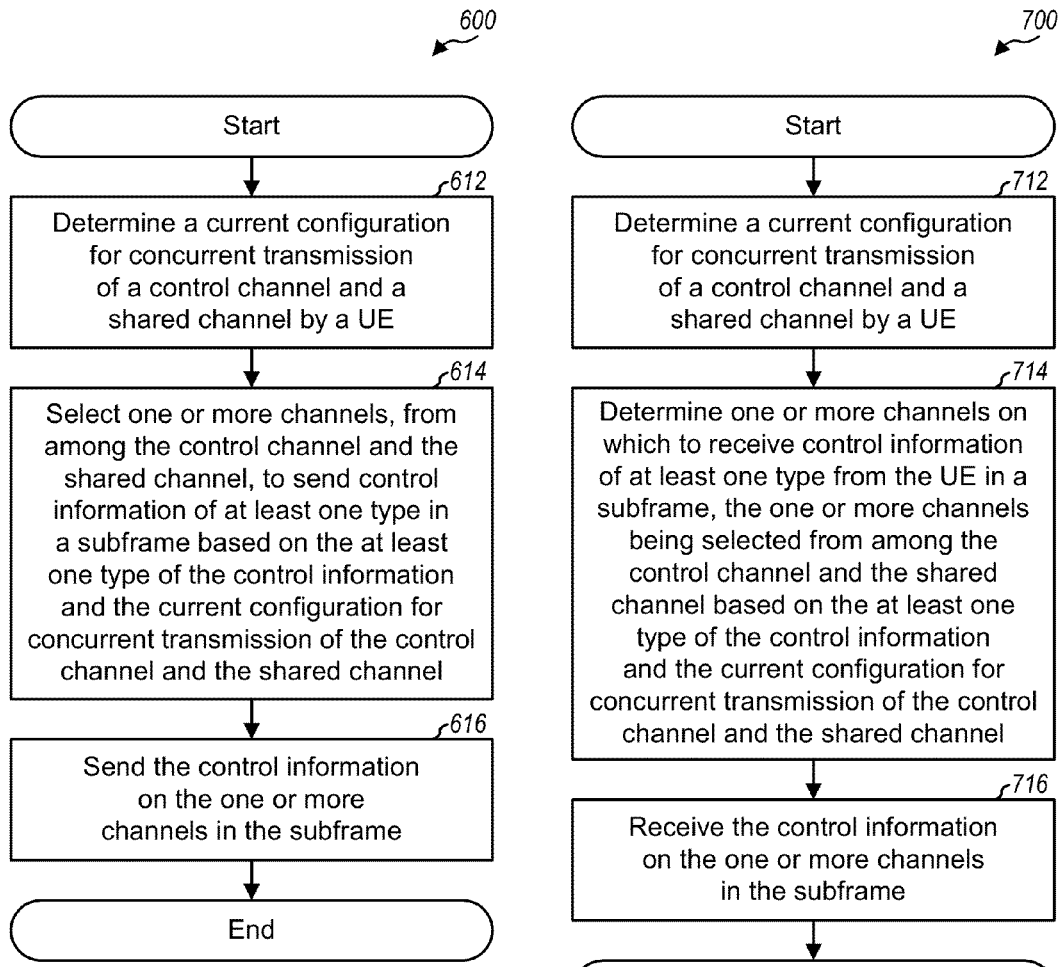

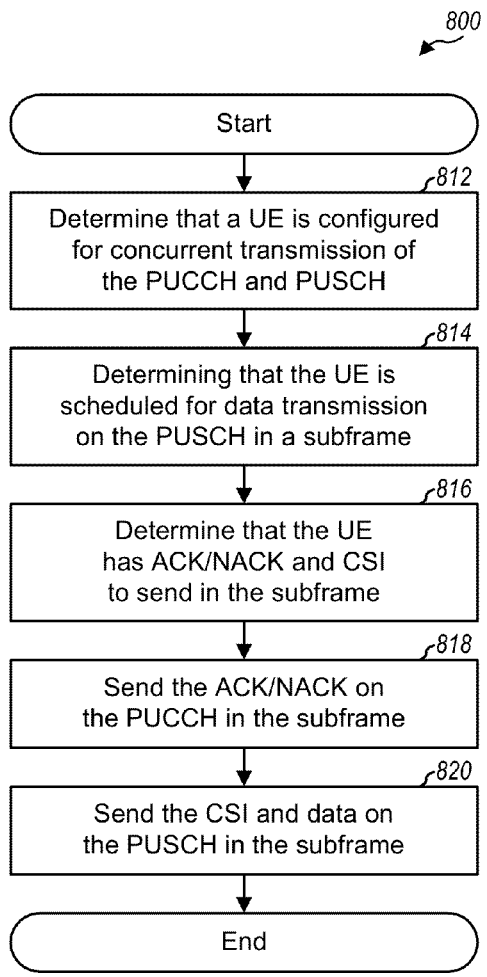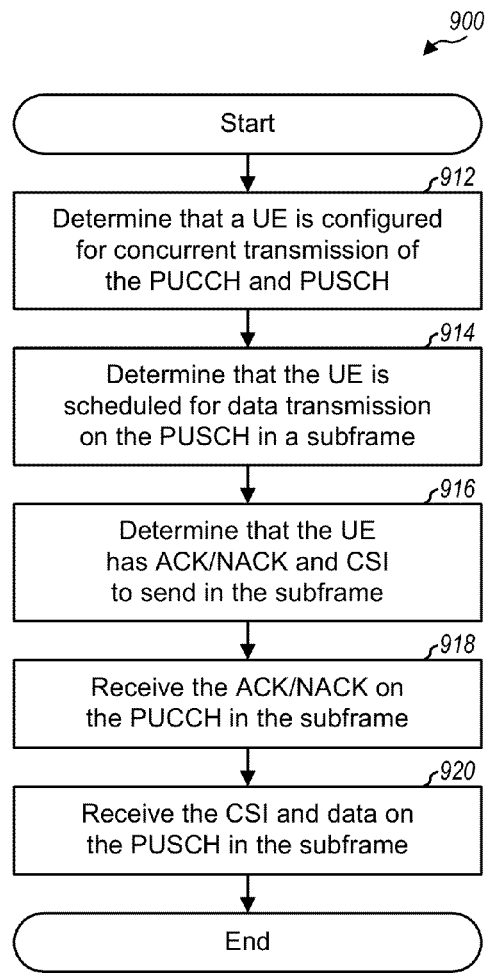
FIG. 8
FIG. 9

TRANSMISSION OF CONTROL INFORMATION ON UPLINK CHANNELS

The present application claims priority to provisional U.S. Application Ser. No. 61/332,598, entitled "TRANSMISSION OF UPLINK CONTROL INFORMATION ON UPLINK CHANNELS," filed May 7, 2010, and incorporated herein by reference in its entirety.

BACKGROUND

I. Field

The present disclosure relates generally to communication, and more specifically to techniques for sending control information in a wireless communication system.

II. Background

Wireless communication systems are widely deployed to provide various services such as voice, video, packet data, messaging, broadcast, etc. These wireless systems may be multiple-access systems capable of supporting multiple users by sharing system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication with a number of user equipments (UEs). A UE may communicate with a base station via a downlink and an uplink. The downlink (or forward link) refers to the communication link from the base station to the UE, and the uplink (or reverse link) refers to the communication link from the UE to the base station.

SUMMARY

Techniques for selecting uplink channels on which to send control information are described herein. A UE may have multiple types of control information to send in a given subframe. The UE may also have one or more uplink channels available for use in the subframe. These channels may relate to a same uplink carrier or to different uplink carriers such as when the UE operates in a multi-carrier mode. The UE may select the uplink channels and send the control information in different manners and according to different criteria in order to achieve good performance.

In one design, the UE may determine its current configuration for concurrent transmission of a control channel and a shared channel. The UE may select one or more channels, from among the control channel and the shared channel, to send control information of at least one type in a same subframe. As described herein, the UE may select the one or more channels based on (i) the at least one type of the control information to send, (ii) the current configuration for concurrent transmission of the control channel and the shared channel, (iii) whether the UE is scheduled for data transmission on the shared channel in the subframe, (iv) whether the UE has sufficient transmit power to transmit the control channel and the shared channel in the subframe, (v) a current configuration for simultaneous transmission of different types of control information by the UE, and/or (vi) other criteria. The UE may send the control information on the one or more channels in the subframe.

The control information may comprise acknowledgement/ negative acknowledgement (ACK/NACK) information and channel state information (CSI). In one design, the UE may select the control channel to send the ACK/NACK information and the shared channel to send the CSI based on one or more criteria.

In one design, a base station may determine the current configuration for concurrent transmission of the control channel and the shared channel by the UE. The base station may determine one or more channels on which to receive control information of at least one type from the UE in the subframe. The one or more channels may be selected from among the control channel and the shared channel based on one or more criteria. The base station may receive the control information on the one or more channels from the UE in the subframe. Various aspects and features of the disclosure are described in further detail below.

BRIEF DESCRIPTION OF THE DRAWINGS

FIG. 6 shows a process for sending control information.
FIG. 7 shows a process for receiving control information.
FIG. 8 shows another process for sending control information.
FIG. 9 shows another process for receiving control information.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
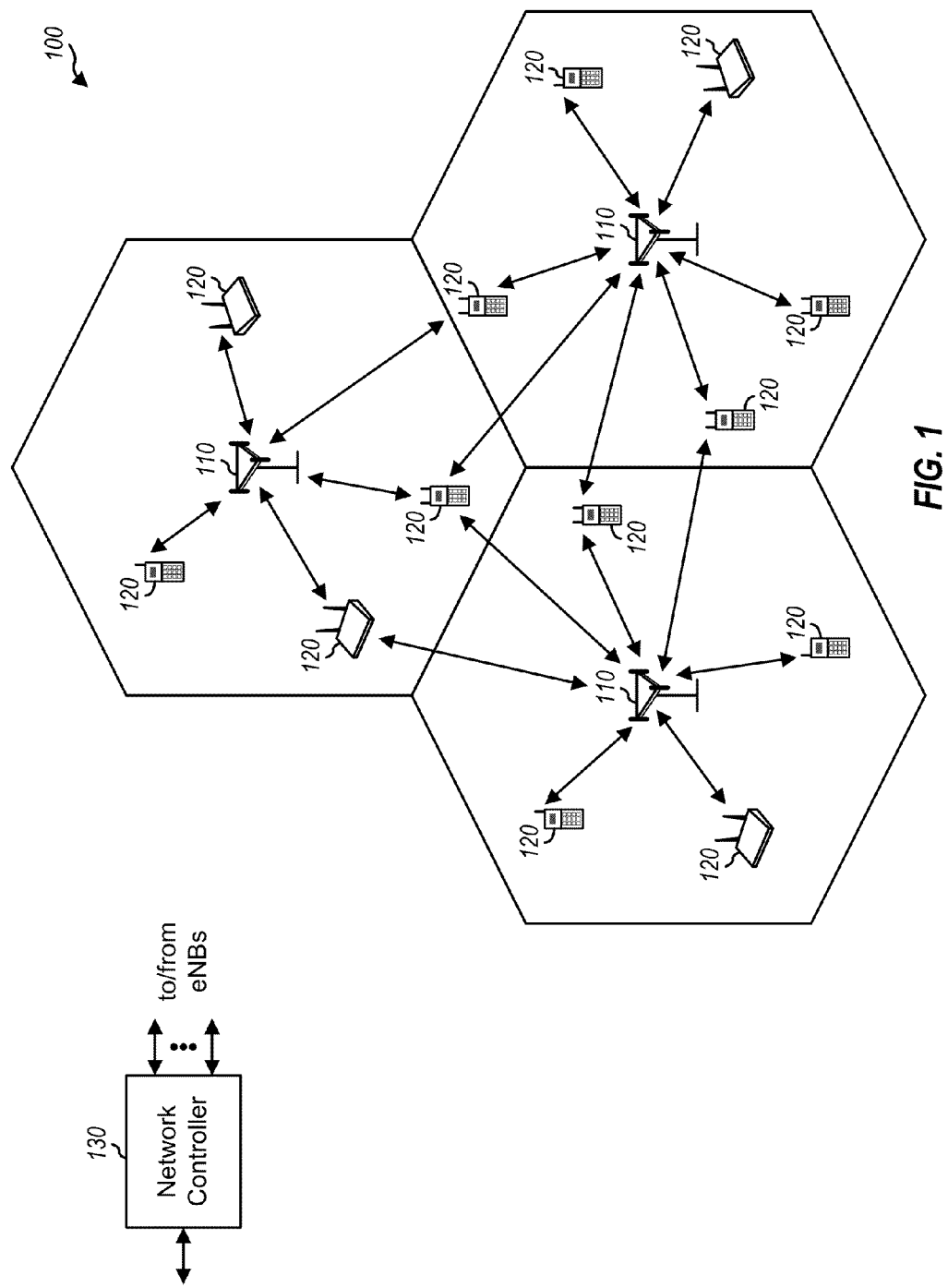
FIG. 1 shows a wireless communication system.

FIG. 1 shows a wireless communication system 100, which may be a LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve system capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area.

A network controller 130 may couple to a set of eNBs and may provide coordination and control for these eNBs. Network controller 130 may comprise a Mobility Management Entity (MME) and/or some other network entity.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

System 100 may support transmission of data with hybrid automatic retransmission (HARQ) to improve reliability. For HARQ, a transmitter (e.g., an eNB) may send an initial transmission of a packet of data and may send one or more additional transmissions of the packet, if needed, until the packet is decoded correctly by a receiver (e.g., a UE), or the maximum number of transmissions of the packet has occurred, or some other termination condition is encountered. After each transmission of the packet, the receiver may decode all received transmissions of the packet to attempt to recover the packet. The receiver may send acknowledgement (ACK) information if the packet is decoded correctly or negative acknowledgement (NACK) information if the packet is decoded in error. The transmitter may send another transmission of the packet if NACK is received and may terminate transmission of the packet if ACK is received. In the description herein, one or more ACKs and/or one or more NACKs for one or more packets may be referred to as ACK/NACK, ACK/NACK information, or ACK/NACK bits. A packet may also be referred to as a transport block, a codeword, etc.

The system 100 may support operation on a single carrier or multiple carriers for each of the downlink and uplink. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc. Each carrier may be assignable to one or more UEs for communication. Operation on multiple carriers may also be referred to as carrier aggregation or multi-carrier operation. A UE may operate on one or more carriers for the downlink (or downlink carriers) and one or more carriers for the uplink (or uplink carriers) for communication with an eNB.

System 100 may utilize frequency division duplexing (FDD) or time division duplexing (TDD). For FDD, the downlink and uplink are allocated separate frequency channels. A frequency channel may correspond to a carrier or some other range of frequencies. Downlink transmission and uplink transmission may be sent concurrently on the two frequency channels. For TDD, the downlink and uplink share the same frequency channel. Downlink transmission and uplink transmission may be sent on the same frequency channel in different time intervals.

Figure 2:
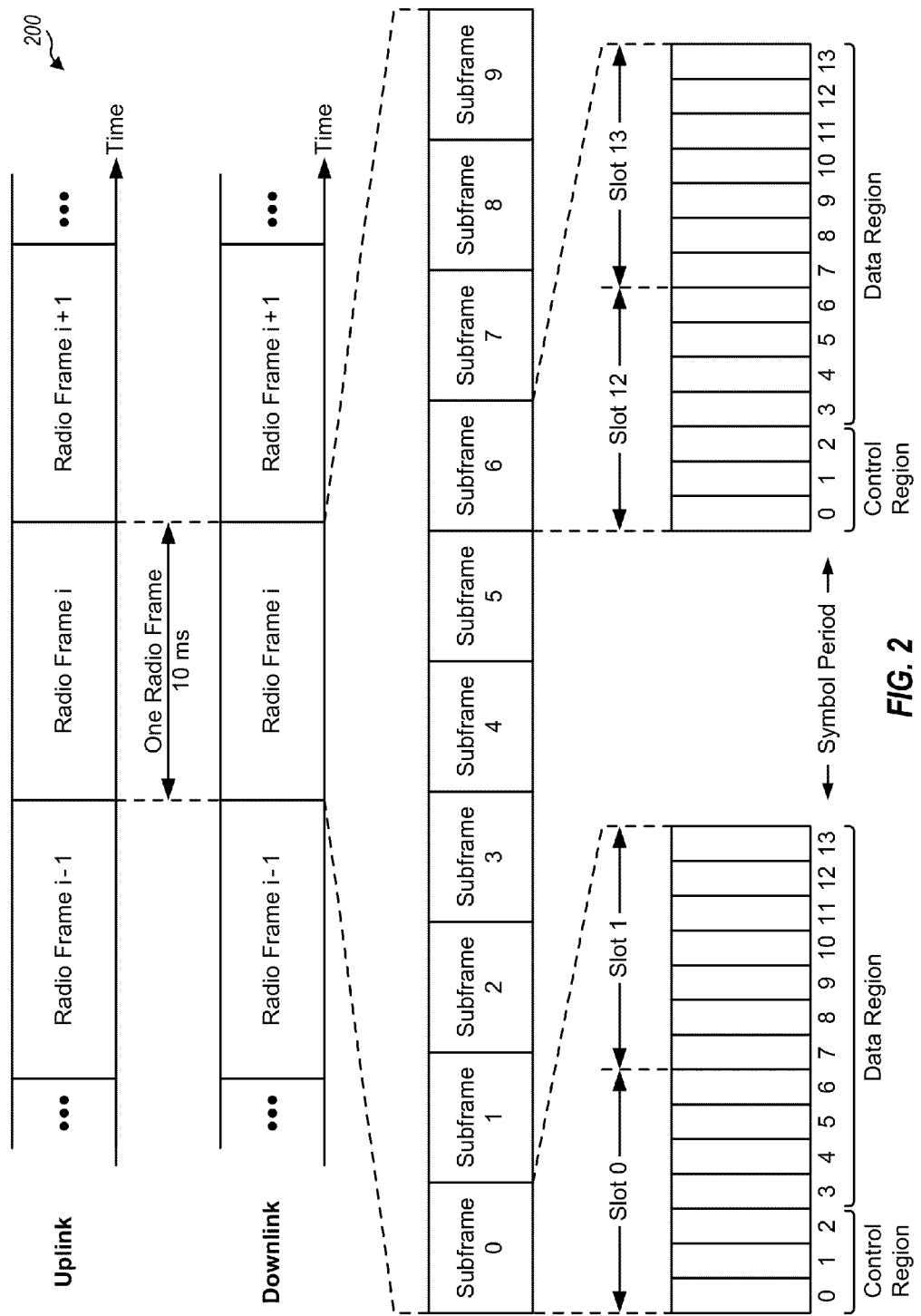
FIG. 2 shows an exemplary frame structure.

FIG. 2 shows a frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink for both FDD and TDD. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, the subcarrier spacing may be 15 kilohertz (KHz), and $N_{FFT}$ may be equal to 128, 256, 512, 1024 or 2048 for system bandwidth of 1.25, 2.5, 5, 10 or 20 megahertz (MHz), respectively.

The available time frequency resources for each of the downlink and uplink may be partitioned into resource blocks. Each resource block may cover 12 subcarriers in one slot. The number of resource blocks in each slot may be dependent on the system bandwidth and may range from 6 to 110 for system bandwidth of 1.25 to 20 MHz, respectively. Each resource block may include a number of resource elements. Each resource element may cover one subcarrier in one symbol period and may be used to transmit one modulation symbol, which may be a real or complex value.

Figure 3:
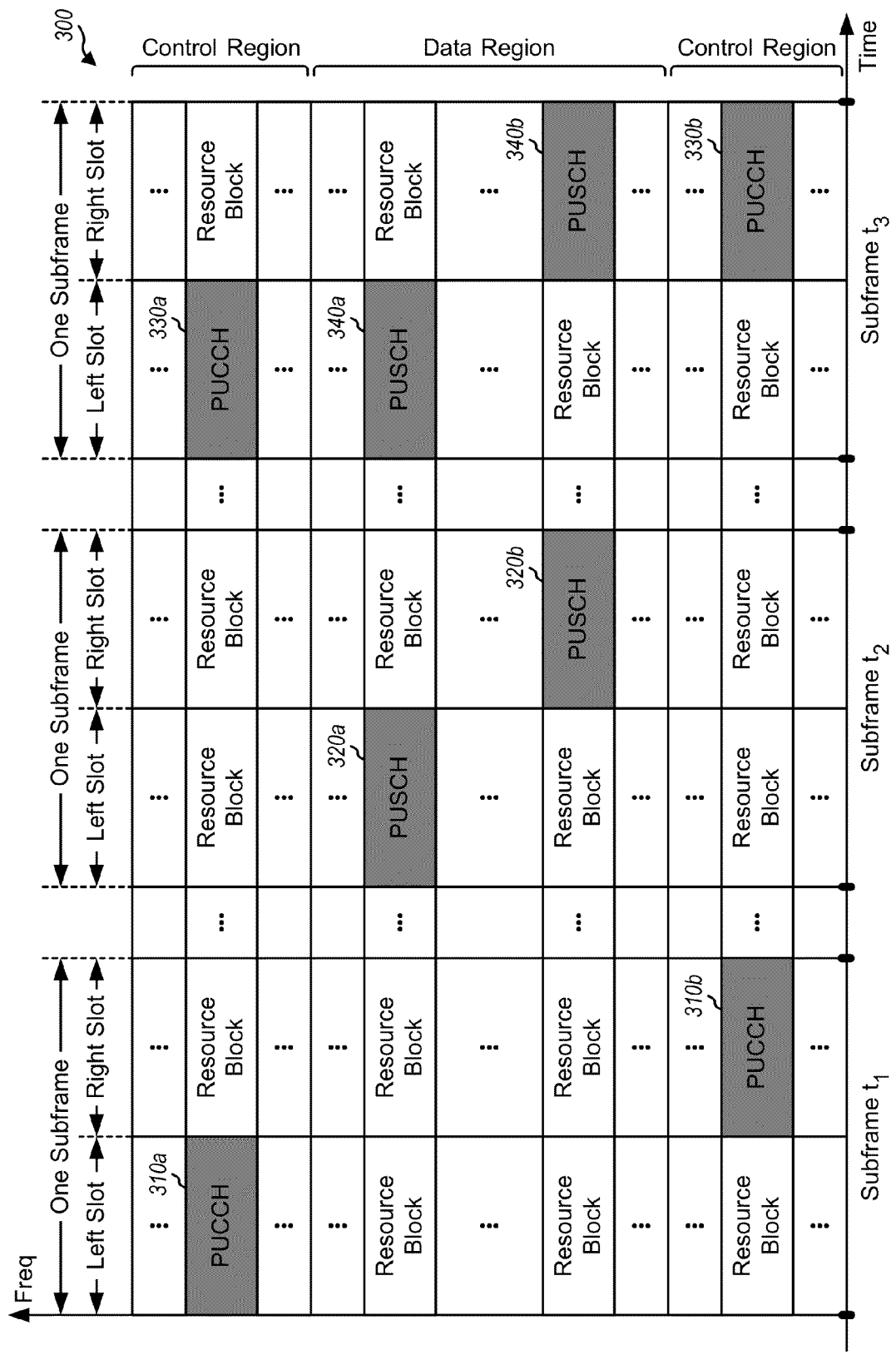
FIG. 3 shows an exemplary subframe structure.

FIG. 3 shows a subframe structure 300 for the uplink in LTE. Each subframe for the uplink may include a control region and a data region, which may be frequency division multiplexed (FDM). The control region may be formed at the two edges of the system bandwidth and may have a configurable size, which may be selected based on the amount of control information being sent on the uplink by the UEs. The data region may include the remaining frequency not covered by the control region.

A UE 120 may be assigned resource block 310a and 310b in the control region in subframe $t_1$ to send control information to an eNB 110. The UE 120 may send control information on a Physical Uplink Control Channel (PUCCH) on assigned resource block 310a and 310b in the control region. The UE 120 may be assigned resource blocks 320a and 320b in the data region in subframe $t_2$ to send data to the eNB 110. The UE 120 may send only data, or both data and control information, on a Physical Uplink Shared Channel (PUSCH) on assigned resource blocks 320a and 320b in the data region. The UE 120 may be assigned resource block 330a and 330b in the control region and resource blocks 340a and 340b in the data region in subframe $t_3$ to send control information and data to the eNB 110. The UE 120 may send some or all control information on the PUCCH on assigned resource block 330a and 330b in the control region. The UE 120 may send data and some, all, or no control information on the PUSCH on assigned resource blocks 340a and 340b in the data region.

As shown in FIG. 3, an uplink transmission may span both slots of a subframe and may hop across frequency. The UE 120 may transmit on a set of contiguous subcarriers in each symbol period of a subframe (e.g., in each of subframes $t_1$ and $t_2$) in order to obtain a single-carrier waveform, which may have a lower peak-to-average power ratio (PAPR). The UE 120 may transmit on multiple sets of contiguous subcarriers in each symbol period of a subframe (e.g., in subframe $t_3$) in order to obtain higher transmission capacity.

The UE 120 may send various types of control information such as ACK/NACK for data transmission sent on the downlink with HARQ, channel state information (CSI) for a communication channel from the eNB to the UE, a scheduling request (SR) to request for resources for data transmission on the uplink, a buffer status report (BSR) indicative of the amount of data to send on the uplink, some other information, or a combination thereof. CSI may include channel quality indicator (CQI), precoding matrix indicator (PMI), rank indicator (RI), or a combination thereof. RI may indicate the number of layers (or spatial channels) to use for a multiple-input multiple-output (MIMO) data transmission to the UE. PMI may indicate a precoding matrix or vector to use to precode data prior to transmission to the UE. CQI may indicate a channel quality of each of at least one packet to send to the UE.

The UE 120 may send one or more bits of ACK/NACK depending on the number of packets (or transport blocks) to be acknowledged. The UE 120 may send a single bit of ACK/NACK for a single packet received on a single carrier in a single subframe. The UE 120 may send multiple bits of ACK/NACK for multiple packets received on multiple carriers (for multi-carrier operation), in multiple subframes (for TDD), on multiple layers (for MIMO), or a combination thereof. The UE 120 may be configured to periodically send CSI for one or more downlink carriers to the eNB. The UE 120 may also send CSI for one or more downlink carriers whenever requested by the eNB 110.

The UE 120 may have one or more types of control information to send in a given subframe. The UE 120 may send the control information on the PUCCH using one of a number of available PUCCH formats. Table 1 lists some PUCCH formats supported in LTE Release 8.

TABLE 1

PUCCH Formats

| PUCCH Format | Number of Info Bits | Description |
|---|---|---|
| 1a | 1 | Used to send one bit of ACK/NACK. |
| 1b | 2 | Used to send two bits of ACK/NACK. |
| 2 | 20 | Used to send 20 bits of CSI. |
| 2a | 21 | Used to send 20 bits of CSI and one bit of ACK/NACK. |
| 2b | 22 | Used to send 20 bits of CSI and two bits of ACK/NACK. |

The PUCCH formats in Table 1 and the various channels and signals in LTE are described in 3GPP TS 36.211, entitled "Evolved Universal Terrestrial Radio Access (E-UTRA); Physical Channels and Modulation," which is publicly available.

The UE 120 may support various features to improve performance. For example, the UE may support one or more of the following features:

MIMO transmission—data transmission on multiple layers formed by multiple antennas at the UE and multiple antennas at an eNB, Transmit diversity—data transmission from multiple transmit antennas to improve reliability, Multi-carrier operation—data transmission on multiple carriers on the downlink and/or uplink, Clustered data transmission—data transmission on multiple non-contiguous sets of subcarriers, and Concurrent PUSCH and PUCCH—transmission of both PUSCH and PUCCH in the same subframe.

The UE 120 may also support other features that can improve performance.

In one design, the UE 120 may operate in one of several supported operating modes at any given moment. For example, the UE 120 may support one or more of the operating modes listed in Table 2.

TABLE 2

| Operating Mode | Description |
|---|---|
| Basic Mode | Support operation on a single antenna at the UE, no cluster data transmission, and transmission of only PUSCH or only PUCCH in a given subframe. |
| Enhanced Mode (with SC constraint) | Support MIMO and transmit diversity via multiple antennas at the UE (with single-carrier constraint per-antenna), and transmission of only PUSCH or only PUCCH in a given subframe. |
| Enhanced Mode (without SC constraint) | Support clustered data transmission, multi-carrier operation, MIMO and transmit diversity via multiple antennas at the UE (without requiring single-carrier constraint per-antenna), and with or without concurrent transmission of PUSCH and PUCCH. |

The basic mode may also be referred to as LTE Release 8/9 (Rel-8/9) mode. The enhanced mode may also be referred to as LTE Release 10 (Rel-10) mode. Single-carrier (SC) constraint refers to a requirement to transmit on contiguous subcarriers in order to maintain a single-carrier waveform having a lower PAPR. The UE 120 may be configured to transmit on contiguous subcarriers (e.g., only PUCCH or only PUSCH) with the single-carrier constraint and may also be configured to transmit on non-contiguous subcarriers (e.g., both PUCCH and PUSCH) without the single-carrier constraint.

In one design, the UE 120 may be configured to operate in one of the supported operating modes. This configuration may be conveyed to the UE 120 via upper layer signaling, e.g., Radio Resource Control (RRC) signaling from an eNB 110. A suitable operating mode may be selected for the UE 120 based on various criteria such as the capabilities of the UE 120, the available transmit power at the UE 120, etc. For example, the UE 120 may send a power headroom (PHR) report indicative of the amount of transmit power available at the UE 120 relative to the current transmit power used by the UE 120. The UE 120 may be configured to operate in the basic mode if the PHR report indicates that the UE 120 is reaching its maximum transmit power.

The UE 120 may be capable of operating in any one of the operating modes listed in Table 2. The UE 120 may be configured to operate in the enhanced mode and may utilize the features supported by the enhanced mode. The UE 120 may also be configured to operate in the basic mode for whatever reason. The UE 120 may then behave as a Rel-8/9 UE and may utilize the features supported by LTE Release 8/9.

Figure 4:
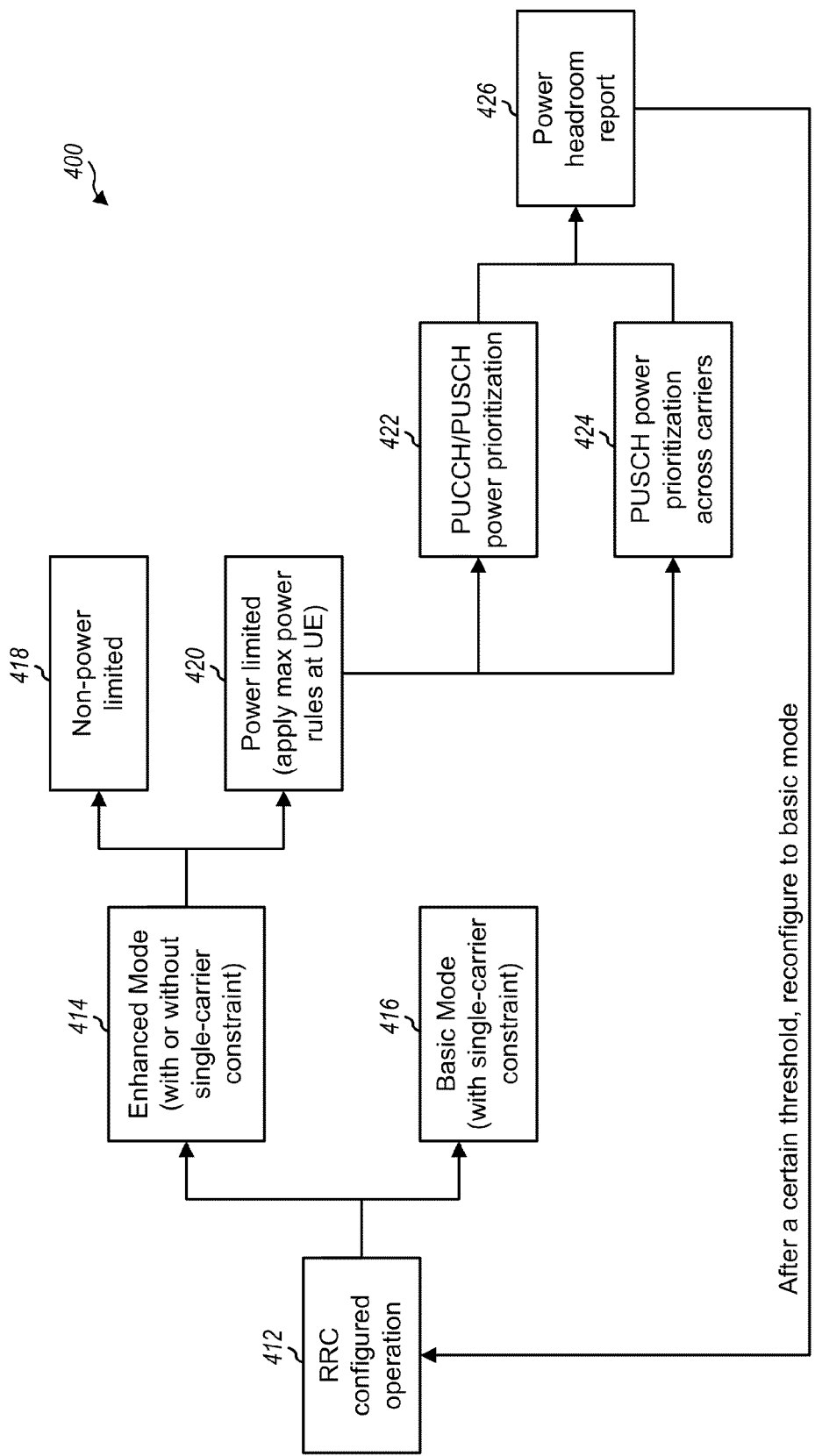
FIG. 4 shows determination of an operating mode of a user equipment.

FIG. 4 shows a diagram 400 illustrating one design for determining an operating mode of a UE. The UE may be configured (e.g., via RRC signaling at block 412) to operate in the enhanced mode (block 414) or the basic mode (block 416). If the UE is configured for operation in the enhanced mode and is not power limited (block 418), then the UE may utilize all of the supported features.

If the UE is configured for operation in the enhanced mode and is power limited (block 420), then the UE may address the power-limited scenario in various manners. In a first design, the UE may perform power scaling based on the priority of different channels (block 422). The UE may first allocate transmit power to a channel of a higher priority in order to meet a target performance requirement as much as possible. The UE may allocate any remaining transmit power to another channel of a lower priority. In a second design, the UE may perform power scaling based on the priority of different carriers if the UE is configured for multi-carrier operation on the uplink (block 424). For example, the UE may first allocate transmit power to the PUSCH on a carrier of a higher priority and may allocate any remaining transmit power to the PUSCH on another carrier of a lower priority.

In another design of addressing the power-limited scenario, the UE may determine whether or not to concurrently transmit the PUCCH and PUSCH based on its scheduled transmit power if it is configured in the enhanced mode without single-carrier constraint. In this case, the UE may transmit both the PUSCH and PUCCH in a given subframe if the UE is not power limited and may transmit only the PUCCH or only the PUSCH if the UE is power limited. In some cases, the eNB may not know whether the UE will transmit only the PUCCH, or only the PUSCH, or both the PUCCH and PUSCH. The eNB may perform a blind decoding procedure for the three cases and obtain control information on the PUCCH and/or the PUSCH based on a result of the blind decoding.

In one design, the UE may send power headroom reports indicative of transmit power limitation at the UE (block 426). The UE may send power headroom reports periodically or whenever triggered by an event, e.g., when the UE reaches a high transmit power threshold. The UE may be reconfigured by the eNB to operate in the basic mode or the enhanced mode with single-carrier constraint if a power headroom report indicates that the UE is power limited.

FIG. 4 shows an exemplary design of determining an operating mode of a UE. The operating mode of the UE may also be determined in other manners. In general, any number of operating modes may be supported. The UE may be configured to operate in one of the supported operating modes in a current configuration and reconfigured to operate in a different operating mode based on various criteria.

The UE may transmit only data, or only control information, or both data and control information in a given subframe. The UE may also transmit one or more types of control information in a given subframe, which may include any one or any combination of ACK/NACK, CQI, PMI, RI, etc. The UE may also transmit one or more bits of ACK/NACK.

The UE may transmit only the PUCCH, or only the PUSCH, or both the PUCCH and PUSCH in a given subframe. Whether the UE can transmit the PUCCH and/or the PUSCH in a given subframe may be dependent on one or more of the following criteria:
1. Whether the UE is configured for concurrent transmission of the PUCCH and PUSCH,
2. Whether the UE is scheduled for data transmission on the PUSCH, and
3. Whether the UE has sufficient transmit power for both the PUCCH and PUSCH.

For criterion 1, the UE may be configured for concurrent transmission of the PUSCH and PUCCH, for example, when the UE is configured for operation in the enhanced mode without single-carrier constraint. Similarly, the UE may not concurrently transmit the PUSCH and PUCCH when the UE is configured for operation in the basic mode or the enhanced mode with single-carrier constraint. For criterion 2, the UE may transmit the PUSCH only when the UE is scheduled for data transmission on the uplink. The UE may transmit only the PUCCH when the UE is not scheduled for data transmission on the uplink. For criterion 3, the UE may transmit both the PUCCH and PUSCH when it has sufficient transmit power. The UE may transmit only the PUCCH (or only the PUSCH) if it has insufficient transmit power. The UE may determine whether criteria 1 and 2 are satisfied based on information from the system. The UE may determine whether criterion 3 is satisfied based on its power headroom.

In one design, the UE may determine whether to transmit the PUCCH and/or the PUSCH in a given subframe based on criteria 1, 2 and 3 described above. In one design, the UE can transmit both the PUCCH and PUSCH in a subframe if the UE is configured for concurrent transmission of the PUSCH and PUCCH and is also scheduled for data transmission on the PUSCH in the subframe. The UE may transmit only the PUSCH in a subframe if the UE is not configured for concurrent transmission of the PUSCH and PUCCH but is scheduled for data transmission on the PUSCH in the subframe. The UE may transmit only the PUCCH in a subframe if the UE is not scheduled for data transmission on the PUSCH in the subframe. The UE may also transmit only the PUCCH, or only the PUSCH, or both the PUCCH and PUSCH in a given subframe based on other criteria.

The UE may have at least one type of control information to send in a given subframe. The control information may relate to one or multiple component carriers. The UE may transmit only the PUCCH, or only the PUSCH, or both the PUCCH and PUSCH in the subframe, e.g., as determined by criteria 1, 2 and 3 described above. The UE may determine whether to send each type of control information on the PUCCH or the PUSCH based on criteria 1, 2 and/or 3 and possibly based further on one or more of the following:
1. Whether the UE is configured to simultaneously send ACK/NACK and CSI on the PUCCH, and
2. The number of bits of ACK/NACK to send by the UE.
The UE may also determine whether to send each type of control information on the PUCCH or the PUSCH based on other criteria.

An exemplary design for sending at least one type of control information on at least one available channel is described below. In a first case, the UE may transmit only the PUCCH if the UE is not scheduled for data transmission on the PUSCH. In this case, the UE may send all control information on the PUCCH. In a second case, the UE may transmit only the PUSCH if the UE is scheduled for data transmission on the PUSCH but is not configured for concurrent transmission of the PUCCH and PUSCH. In this case, the UE may send all control information and data on the PUSCH. In a third case, the UE may transmit both the PUCCH and PUSCH if the UE is configured for concurrent transmission of the PUCCH and PUSCH and is also scheduled for data transmission on the PUSCH. In this case, the UE may send the control information on the PUCCH and/or PUSCH in various manners.

In one design of the third case, the control information may include only ACK/NACK, and the UE may send the ACK/NACK on the PUCCH and may send data on the PUSCH. The ACK/NACK may include one or more bits. The UE may send the ACK/NACK using different PUCCH formats depending on the number of bits of ACK/NACK to send. For example, the UE may send one bit of ACK/NACK using PUCCH format 1a, two bits of ACK/NACK using PUCCH format 1b, or more than two bits of ACK/NACK using some other PUCCH format.

In another design of the third case, the control information may include only CSI, and the UE may send the CSI on the PUCCH and may send data on the PUSCH. The CSI may include only CQI, or only PMI, or only RI, or any combination of CQI, PMI, and RI. The UE may send CSI on the PUCCH using a suitable PUCCH format (e.g., PUCCH format 2) that can carry all bits of the CSI.

In yet another design of the third case, the control information may include both ACK/NACK and CSI, and the UE may send the ACK/NACK on the PUCCH and the CSI and data on the PUSCH. In one design, the UE may send any number of bits of ACK/NACK on the PUCCH and may use a suitable PUCCH format depending on the number of bits to send. The UE may also send one or more other types of control information (e.g., a buffer status report) with the CSI on the PUSCH or with the ACK/NACK on the PUCCH.

In yet another design of the third case, the control information may include both ACK/NACK and CSI, and the UE may send the control information in different manners depending on a Simultaneous-AN-and-CQI parameter. The Simultaneous-AN-and-CQI parameter may indicate whether to send ACK/NACK and CSI together or separately and may be configured for the UE via upper layer (e.g., RRC). If the Simultaneous-AN-and-CQI parameter is set to 'True', then the UE may send both the ACK/NACK and CSI on the PUCCH (e.g., using PUCCH format 2a/2b) and may send data on the PUSCH. Conversely, if the Simultaneous-AN-and-CQI parameter is set to 'False', then the UE may send the ACK/NACK on the PUCCH (e.g., using PUCCH format 1a/1b) and may send the CSI and data on the PUSCH. This design may be used to send any number of bits of ACK/NACK, and the UE may use a suitable format for the PUCCH depending on the number of bits of ACK/NACK to send and whether CSI is also sent on the PUCCH. Alternatively, this design may be used for up to a predetermined number of bits (e.g., one or two bits) of ACK/NACK, and only ACK/NACK may be sent on the PUCCH if there are more than the predetermined number of bits (e.g., more than two bits) of ACK/NACK to send.

Table 3 summarizes the various designs of the first, second and third cases described above for transmission of control information in a subframe. At least one type of control information may also be sent on the PUCCH and/or PUSCH in other manners. The control information to send may relate to one or multiple carriers. In addition, the PUCCH and the PUSCH can correspond to a same or a different uplink carrier. In one example, the design shown in Table 3 may be used when the UE is configured for operation in the enhanced mode.

in the subframe (block 512). If the UE determines that it is not scheduled for data transmission on PUSCH in the subframe ('No'), then it may send the control information on the PUCCH in the subframe (block 522).

If the UE is scheduled for data transmission on the PUSCH in the subframe ('Yes' for block 512), then the UE may determine whether it is configured for concurrent transmission of the PUCCH and PUSCH (block 514). If the answer is 'No', then the UE may send the control information and data on the PUSCH in the subframe (block 524).

If the UE is scheduled for data transmission on the PUSCH in the subframe and is also configured for concurrent transmission of the PUCCH and PUSCH (Yes' for blocks 512 and 514), then the UE may determine whether it has both ACK/NACK and CSI to send in the subframe (block 516). If the answer is 'Yes', then the UE may send the ACK/NACK on the PUCCH and may send the CSI and data on the PUSCH (block 526). Otherwise, if the answer is 'No' for block 516, then the UE may determine whether it has only ACK/NACK or only CSI to send in the subframe (block 518). If the answer is 'Yes', then the UE may send the ACK/NACK or the CSI on the PUCCH and may send the data on the PUSCH (block 528).

Figure 5:
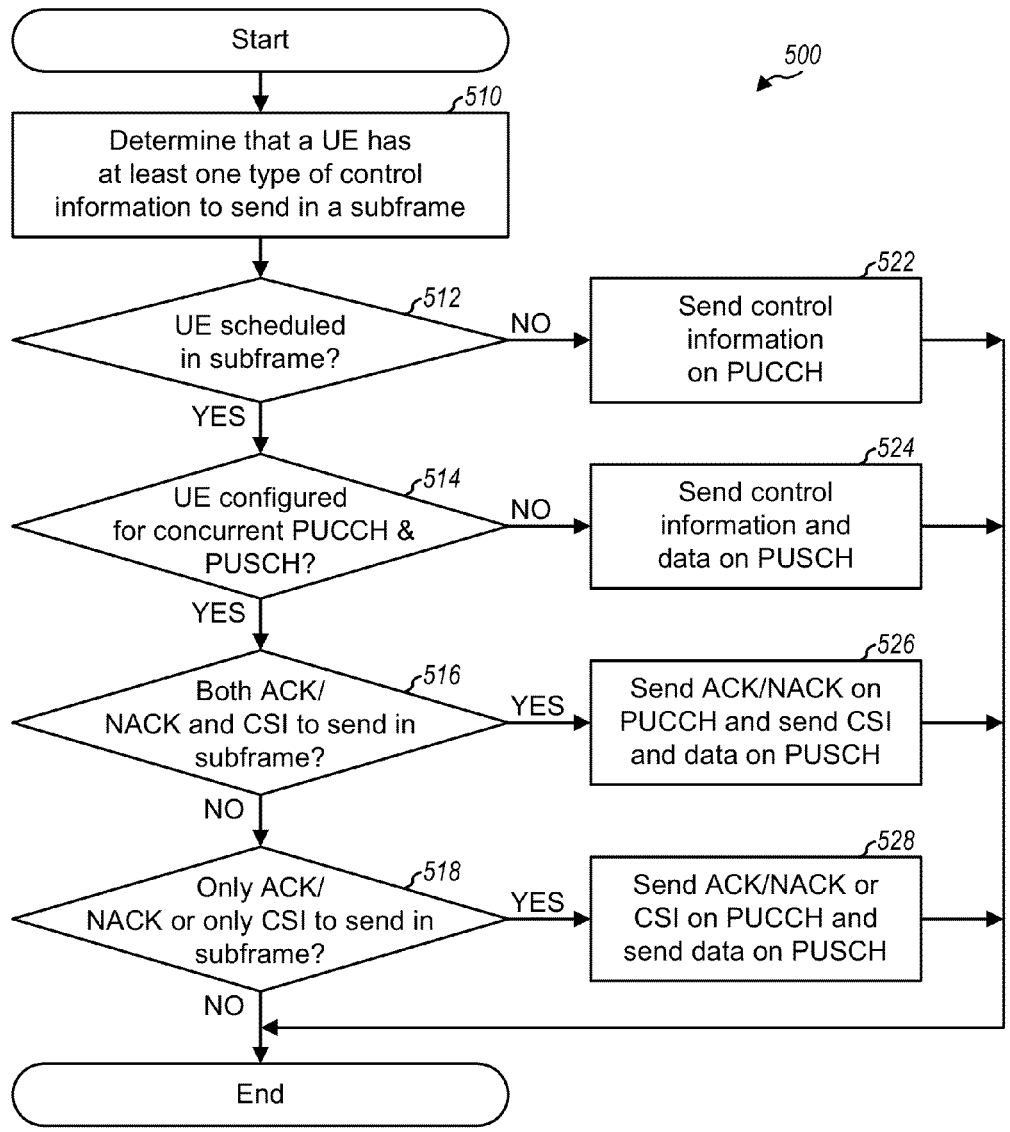
FIG. 5 shows a process for sending control information on the control channel and/or the shared channel.

FIG. 5 shows an exemplary design that implements part of Table 3. The UE may also send ACK/NACK and CSI on only the PUCCH or both the PUCCH and PUSCH in other manners in the enhanced mode. Some examples are described below.

If the UE is not scheduled for data transmission on the PUSCH, then the UE may send ACK/NACK and CSI on the PUCCH. The UE may send a single bit of ACK/NACK and CSI on the PUCCH using PUCCH format 2a/2b. The UE may send multiple bits of ACK/NACK and CSI in various manners. In one design, the UE may send multi-bit ACK/NACK and CSI on the PUCCH using a suitable PUCCH format capable of conveying multiple bits of ACK/NACK and CSI. In another design, the UE may send multi-bit ACK/NACK and CSI on multiple PUCCHs. For example, the UE may send ACK/NACK on one PUCCH and CSI on another PUCCH. In yet another design, the UE may send multi-bit ACK/NACK and CSI via multiple antennas. For example, the UE may send ACK/NACK on the PUCCH using one set of power amplifier and antenna and may send CSI on the PUCCH using another set of power amplifier and antenna. The UE may be able to

TABLE 3

| Available Channel | Description |
| --- | --- |
| Only PUCCH | Send all control information on PUCCH. |
| Only PUSCH | Send all control information and data on PUSCH. |
| Both PUCCH and PUSCH | Only ACK/NACK to send<br>    Send ACK/NACK on PUCCH and data on PUSCH.<br>Only CSI to send<br>    Send CSI on PUCCH and data on PUSCH.<br>Both ACK/NACK and CSI to send<br>    Send ACK/NACK on PUCCH and CSI and data on PUSCH, or<br>Both ACK/NACK and CSI to send with Simultaneous-AN-and-CQI<br>    If Simultaneous-AN-and-CQI = 'True'<br>        Send ACK/NACK and CSI on PUCCH and data on PUSCH, or<br>    If Simultaneous-AN-and-CQI = 'False'<br>        Send ACK/NACK on PUCCH and CSI and data on PUSCH. |

FIG. 5 shows a design of sending control information on the PUCCH and/or PUSCH. The UE may determine that it has at least one type of control information to send in a same uplink subframe (block 510). The UE may further determine whether it is scheduled for data transmission on the PUSCH preserve a single-carrier constraint for each antenna. There may be gain imbalance between different antennas at the UE. A reliable transmission of the PUCCH on a weak antenna with a lower gain may be achieved by using per-antenna power control or some other measure. In yet another design, the UE may transmit only multi-bit ACK/NACK on the PUCCH and may drop the CSI.

If the UE is scheduled for data transmission on the PUSCH, then the UE may send ACK/NACK and CSI on the PUCCH and/or PUSCH. In one design, the UE may send control information of the type with the highest priority (for example, ACK/NACK and/or SR) on the PUCCH. The UE may send control information of another type with a lower priority (e.g., CSI) along with data on the PUSCH. In one design, the UE may send control information on a specific carrier.

The UE may be assigned multiple carriers for the uplink (or uplink carriers). In one design, one uplink carrier may be designated as an uplink anchor carrier. In one design, the UE may transmit the PUCCH on the uplink anchor carrier and may transmit the PUSCH on any uplink carrier on which the UE is scheduled for data transmission. In one design, if the UE is scheduled on the uplink anchor carrier, then the UE may transmit both the PUCCH and PUSCH on this carrier. In this case, the UE may send ACK/NACK on the PUCCH and may send CSI and data on the PUSCH. If the UE is scheduled on an uplink carrier that is not the uplink anchor carrier, then the UE may send ACK/NACK on the PUCCH on the uplink anchor carrier and may send CSI and data on the PUSCH on the scheduled uplink carrier. Alternatively, the UE may send ACK/NACK, CSI and data on the PUSCH on the scheduled uplink carrier.

The UE may be configured for operation in the basic mode. The UE may have ACK/NACK and CSI to send in a given subframe. If the UE is not scheduled for data transmission on the PUSCH in the subframe, then the UE may have only the PUCCH available to send all control information. In one design, the UE may send the ACK/NACK and CSI on the PUCCH (e.g., using PUCCH format 2a/2b) if the Simultaneous-AN-and-CQI parameter is set to 'True' for the UE. Otherwise, the UE may send only the ACK/NACK on the PUCCH (e.g., using PUCCH format 1a/1b) and may drop the CSI if the Simultaneous-AN-and-CQI parameter is set to 'False' for the UE. If the UE is scheduled for data transmission on the PUSCH in the subframe, then the UE may send only ACK/NACK or both ACK/NACK and CSI (e.g., depending on the Simultaneous-AN-and-CQI parameter) along with data on the PUSCH.

The designs described above for sending ACK/NACK and CSI in the enhanced mode may provide various advantages. First, these designs may allow the UE to send multiple bits of ACK/NACK along with CSI. This may support data transmission on multiple carriers, in multiple subframes, and/or on multiple layers. Second, these designs may allow the UE to reliably send both ACK/NACK and CSI (instead of dropping CSI). Frequently dropping CSI may adversely impact performance of data transmission on the downlink, especially on multiple carriers.

FIG. 6 shows a design of a process 600 for sending control information. Process 600 may be performed by a UE (as described below) or by some other entity. The UE may determine its current configuration for concurrent transmission of a control channel (e.g., the PUCCH) and a shared channel (e.g., the PUSCH) (block 612). The UE may select one or more channels, from among the control channel and the shared channel, to send control information of at least one type in a subframe (block 614). The UE may select the one or more channels based on the at least one type of the control information and the current configuration for concurrent transmission of the control channel and the shared channel. The UE may send the control information on the one or more channels in the subframe (block 616).

The UE may also select the one or more channels based on other criteria. In one design, the UE may select the one or more channels based further on (i) whether the UE is scheduled for data transmission on the shared channel in the subframe, (ii) whether the UE has sufficient transmit power to transmit both the control channel and the shared channel, (iii) a current configuration of simultaneous transmission of ACK/NACK and CSI by the UE, (iv) some other criterion, or (v) a combination of the criteria.

The control information may comprise ACK/NACK and CSI. In one design, the UE may select the control channel to send the ACK/NACK and the shared channel to send the CSI based on (i) a determination that the current configuration permits concurrent transmission of the control channel and the shared channel, (ii) a determination that the UE is scheduled for data transmission on the shared channel in the subframe, (iii) a determination that the UE has sufficient transmit power to transmit both the control channel and the shared channel, (iv) a determination that the current configuration does not require simultaneous transmission of the ACK/NACK and the CSI, (v) a number of bits of the ACK/NACK (e.g., if the ACK/NACK comprises more than a predetermined number of bits), (vi) some other criterion, or (vii) a combination of the criteria. In one design, the UE may select the control channel for both the ACK/NACK and the CSI if the ACK/NACK comprises fewer than the predetermined number of bits. In another design, the UE may select the shared channel for the ACK/NACK and the CSI if the ACK/NACK comprises fewer than the predetermined number of bits. The UE may also select the control channel or the shared channel for each of the ACK/NACK and the CSI in other manners, as described above.

In another design, the UE may send the control information on multiple control channels. For example, the UE may select a first control channel to send the ACK/NACK and a second control channel to send the CSI. In yet another design, the UE may send the control channel via multiple antennas. For example, the UE may send the ACK/NACK on the control channel via a first antenna and may send the CSI on the control channel via a second antenna. The UE may determine the transmit power of the control channel for each antenna based on a target performance of the control channel.

In one design, the control information may comprise only ACK/NACK, and the UE may select the control channel to send the ACK/NACK. In another design, the control information comprises only CSI, and the UE may select the control channel to send the CSI. For both designs, the UE may send data on the shared channel if the UE is scheduled for data transmission on the shared channel.

In one design, the control information may comprise a first type of control information with a first priority and a second type of control information with a second priority lower than the first priority. The first type of control information may comprise ACK/NACK, scheduling request, etc. The second type of control information may comprise CSI, etc. The UE may select the control channel to send the first type of control information and may select the shared channel to send the second type of control information.

In one design, the UE may select the control channel to send the control information based on (i) a determination that the UE is not scheduled for data transmission on the shared channel in the subframe and/or (ii) any one or any combination of the criteria described above. In another design, the UE may select the shared channel to send the control information based on a determination that the UE is scheduled for data transmission on the shared channel in the subframe but is not configured for concurrent transmission of the control channel and the shared channel.

In one design, the UE may determine its available transmit power and may send a power headroom report to its serving base station. The UE may receive signaling indicating the current configuration for concurrent transmission of the control channel and the shared channel by the UE. This current configuration may be determined based on the power headroom report from the UE.

FIG. 7 shows a design of a process 700 for receiving control information. Process 700 may be performed by a base station/eNB (as described below) or by some other entity. The base station may determine a current configuration for concurrent transmission of a control channel (e.g., the PUCCH) and a shared channel (e.g., the PUSCH) by a UE (block 712). The base station may determine one or more channels on which to receive control information of at least one type from the UE in a subframe (block 714). The one or more channels may be selected, from among the control channel and the shared channel, based on the at least one type of the control information and the current configuration for concurrent transmission of the control channel and the shared channel. The base station may receive the control information on the one or more channels in the subframe (block 716).

The one or more channels may also be selected based on other criteria. In one design, the one or more channels may be selected based further on (i) whether the UE is scheduled for data transmission on the shared channel in the subframe, (ii) whether the UE has sufficient transmit power to transmit both the control channel and the shared channel, (iii) a current configuration of simultaneous transmission of ACK/NACK and CSI by the UE, (iv) some other criterion, or (v) a combination of the criteria.

The control information may include different types such as ACK/NACK and CSI. In one design, the control channel may be selected to send the ACK/NACK and the shared channel may be selected to send the CSI based on (i) a determination that the current configuration permits concurrent transmission of the control channel and the shared channel by the UE, (ii) a determination that the UE is scheduled for data transmission on the shared channel in the subframe, (iii) a determination that the UE has sufficient transmit power to transmit both the control channel and the shared channel, (iv) a determination that the current configuration does not require simultaneous transmission of the ACK/NACK and the CSI by the UE, (v) a number of bits of the ACK/NACK, (vi) some other criterion, or (vii) a combination of the criteria. In one design, the control channel may be selected to send all of the control information based on any one or any combination of the criteria listed above.

In one design, the UE may send the ACK/NACK on the control channel and the CSI on the shared channel on a single uplink carrier. In another design, the UE may send the ACK/NACK on the control channel on a first uplink carrier and may send the CSI on the shared channel on a second uplink carrier. The first uplink carrier may be an uplink anchor carrier for the UE. The second uplink carrier may be an uplink carrier on which the UE is scheduled for data transmission.

In another design, a first control channel may be selected to send the ACK/NACK, and a second control channel may be selected to send the CSI. In yet another design, the ACK/NACK may be sent on the control channel via a first antenna at the UE, and the CSI may be sent on the control channel via a second antenna at the UE.

In one design, the control information may comprise only ACK/NACK, and the control channel may be selected to send the ACK/NACK. In another design, the control information may comprise only CSI, and the control channel may be selected to send the CSI. For both designs, the shared channel may be selected to send data if the UE is scheduled for data transmission on the shared channel.

The control information may comprise a first type of control information with a first priority and a second type of control information with a second priority lower than the first priority. In one design, the control channel may be selected to send the first type of control information, and the shared channel may be selected to send the second type of control information.

In one design, the base station may receive a power headroom report from the UE. The current configuration for concurrent transmission of the control channel and the shared channel by the UE may be determined based on the power headroom report. The base station may send signaling indicating the current configuration for concurrent transmission of the control channel and the shared channel to the UE.

FIG. 8 shows a design of a process 800 for sending control information. Process 800 may be performed by a UE (as described below) or by some other entity. The UE may determine that it is configured for concurrent transmission of the PUCCH and the PUSCH (block 812). The UE may also determine that it is scheduled for data transmission on the PUSCH in a subframe (block 814). The UE may determine that it has ACK/NACK and CSI to send in the subframe (block 816). The UE may send the ACK/NACK on the PUCCH in the subframe (block 818) and may send the CSI and data on the PUSCH in the subframe (block 820).

FIG. 9 shows a design of a process 900 for receiving control information. Process 900 may be performed by a base station/eNB (as described below) or by some other entity. The base station may determine that a UE is configured for concurrent transmission of the PUCCH and the PUSCH (block 912). The base station may also determine that the UE is scheduled for data transmission on the PUSCH in a subframe (block 914). The base station may determine that the UE has ACK/NACK and CSI to send in the subframe (block 916). The base station may receive the ACK/NACK on the PUCCH in the subframe (block 918) and may receive the CSI and data on the PUSCH in the subframe (block 920).

Figure 10:
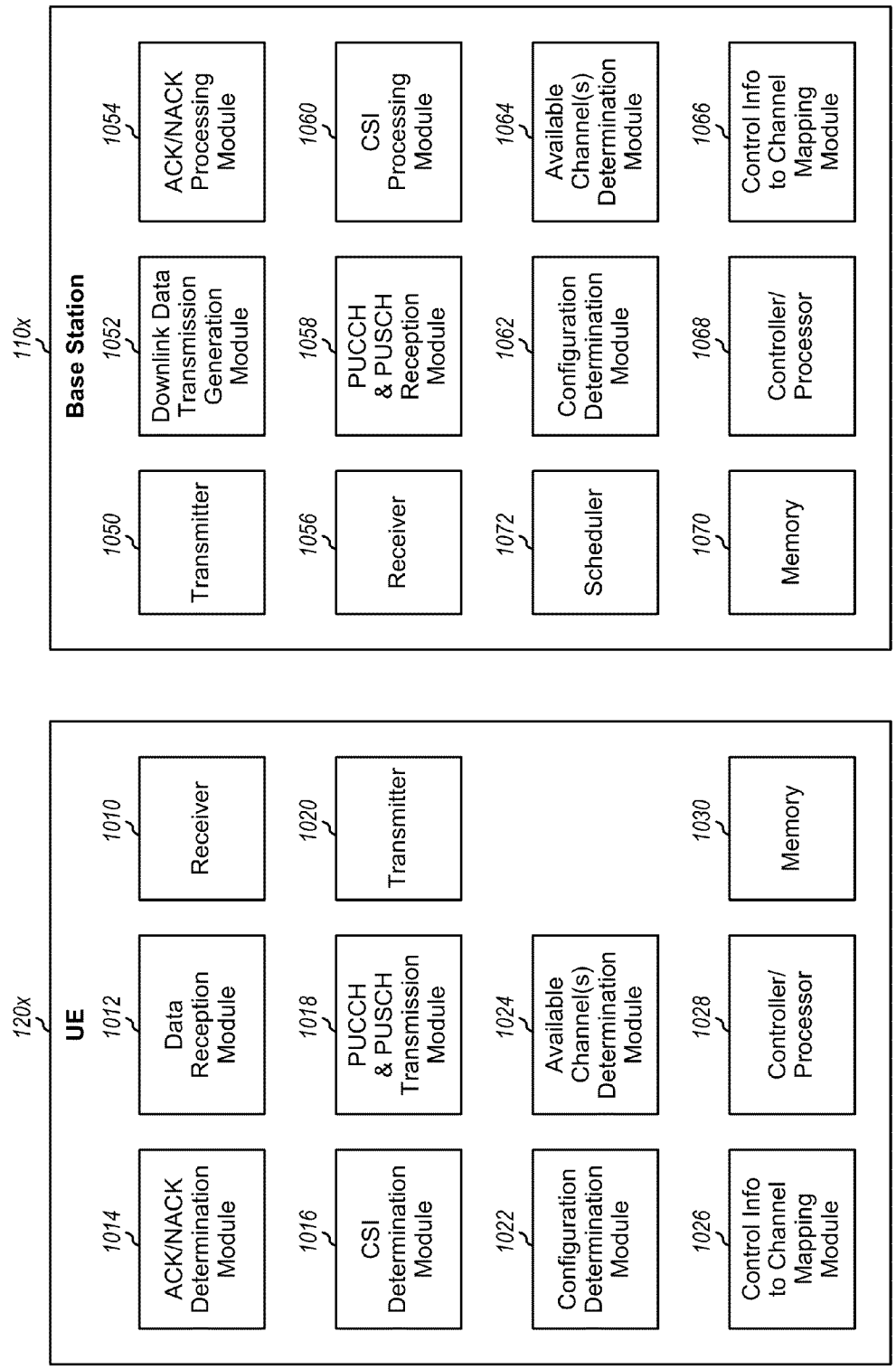
FIG. 10 shows a block diagram of a base station and a user equipment.

FIG. 10 shows a block diagram of a design of a base station/eNBs 110x and a UE 120x, which may be one of the base stations/eNBs and one of the UEs in FIG. 1. Within UE 120x, a receiver 1010 may receive and process downlink signals comprising data transmissions sent by base stations. A module 1012 may process (e.g., demodulate and decode) the received data transmissions. A module 1014 may determine ACKs and/or NACKs for the received data transmissions. Module 1014 may also perform bundling of ACKs and/or NACKs for packets received on multiple carriers, in multiple subframes, and/or on multiple layers, if applicable. Module 1014 may provide one or more bits of ACK/NACK for all received packets. A module 1016 may determine CSI (e.g., CQI, PMI and/or RI) for each downlink carrier for which a CQI report is due or requested.

A module 1022 may determine an operating mode of UE 120x (e.g., the basic mode or the enhanced mode). Module 1022 may also determine a current configuration for concurrent transmission of the PUCCH and PUSCH by the UE. Module 1022 may also determine a current configuration for simultaneous transmission of ACK/NACK and CSI by the UE. A module 1024 may determine whether the PUCCH and/or PUSCH are available to send control information in a given subframe, e.g., as described above. A module 1026 may map different types of control information to send in a given subframe to the PUCCH and/or PUSCH available in the subframe, e.g., as shown in Table 3 or based on any of the designs described above. A module 1018 may generate a transmission of the PUCCH based on all control information to send on the PUCCH. Module 1018 may generate a transmission of the PUSCH based on data and all control information (if any) to send on the PUSCH. A transmitter 1020 may generate and transmit an uplink signal comprising the PUCCH transmission and/or the PUSCH transmission. A controller/processor 1028 may direct the operation of various modules within UE 120*x*. A memory 1030 may store data and program codes for UE 120*x*.

Within base station 110*x*, a module 1052 may generate data transmissions on the downlink for UE 120*x* and/or other UEs. A transmitter 1050 may generate and transmit downlink signals comprising the data transmissions. A receiver 1056 may receive and process uplink signals transmitted by UE 120*x* and other UEs. A module 1058 may process a received signal to recover a PUCCH transmission and/or a PUSCH transmission from UE 120*x*.

A module 1062 may determine an operating mode of UE 120*x*, determine whether UE 120*x* is configured for concurrent transmission of the PUCCH and PUSCH, determine whether UE 120*x* is configured for simultaneous transmission of ACK/NACK and CSI, etc. A module 1064 may determine whether the PUCCH and/or PUSCH are available to UE 120*x* to send control information in a given subframe. A module 1066 may determine which type(s) of control information to receive on the PUCCH and/or PUSCH in the subframe. A module 1054 may obtain ACK/NACK from the PUCCH or PUSCH (as indicated by module 1066), perform unbundling if necessary, and provide indications to terminate or continue transmission of each packet. A module 1060 may process CSI from the PUCCH or PUSCH (as also indicated by module 1066). Module 1060 may determine the number of packets to send, determine a precoding matrix or vector to use for data transmission to UE 120*x*, and select a modulation and coding scheme (MCS) for each packet to transmit to UE 120*x* based on the CSI. The various modules within base station 110*x* may operate as described above. A controller/processor 1068 may direct the operation of various modules within base station 110*x*. A memory 1070 may store data and program codes for base station 110*x*. A scheduler 1072 may schedule UEs for data transmissions.

The modules in FIG. 10 may comprise processors, electronic devices, hardware devices, electronic components, logical circuits, memories, software codes, firmware codes, etc., or any combination thereof.

Figure 11:
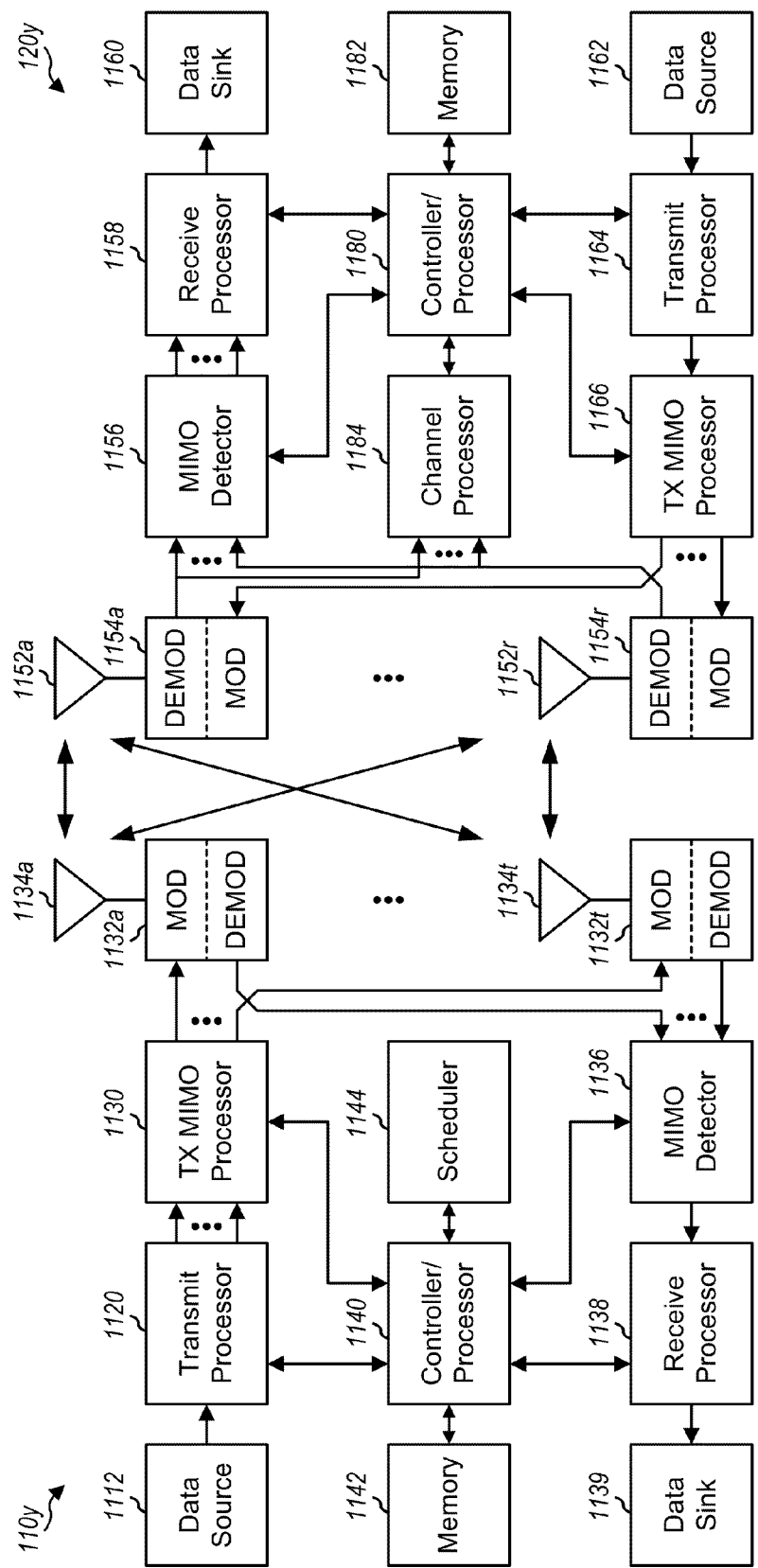
FIG. 11 shows another block diagram of a base station and a user equipment.

FIG. 11 shows a block diagram of a design of a base station/eNB 110*y* and a UE 120*y*, which may be one of the base stations/eNBs and one of the UEs in FIG. 1. Base station 110*y* may be equipped with T antennas 1134*a* through 1134*t*, and UE 120*y* may be equipped with R antennas 1152*a* through 1152*r*, where in general T≥1 and R≥1.

At base station 110*y*, a transmit processor 1120 may receive data from a data source 1112 for one or more UEs, process (e.g., encode and modulate) the data for each UE based on one or more MCSs selected for that UE, and provide data symbols for all UEs. Transmit processor 1120 may also process control information (e.g., for downlink grants, uplink grants, configuration messages, etc.) and provide control symbols. Processor 1120 may also generate reference symbols for reference signals. A transmit (TX) multiple-input multiple-output (MIMO) processor 1130 may precode the data symbols, the control symbols, and/or the reference symbols (if applicable) and may provide T output symbol streams to T modulators (MOD) 1132*a* through 1132*t*. Each modulator 1132 may process its output symbol stream (e.g., for OFDM, etc.) to obtain an output sample stream. Each modulator 1132 may further condition (e.g., convert to analog, amplify, filter, and upconvert) its output sample stream to obtain a downlink signal. T downlink signals from modulators 1132*a* through 1132*t* may be transmitted via T antennas 1134*a* through 1134*t*, respectively.

At UE 120*y*, antennas 1152*a* through 1152*r* may receive the downlink signals from base station 110*y* and/or other base stations and may provide received signals to demodulators (DEMODs) 1154*a* through 1154*r*, respectively. Each demodulator 1154 may condition (e.g., filter, amplify, downconvert, and digitize) its received signal to obtain input samples. Each demodulator 1154 may further process the input samples (e.g., for OFDM, etc.) to obtain received symbols. A MIMO detector 1156 may obtain received symbols from all R demodulators 1154*a* through 1154*r*, perform MIMO detection on the received symbols if applicable, and provide detected symbols. A receive processor 1158 may process (e.g., demodulate and decode) the detected symbols, provide decoded data for UE 120*y* to a data sink 1160, and provide decoded control information to a controller/processor 1180. A channel processor 1184 may derive a channel estimate for base station 110*y* based on one or more reference signals transmitted by base station 110*y*. Processor 1184 may also determine CSI to report by UE 120*y*.

On the uplink, at UE 120*y*, a transmit processor 1164 may receive and process data from a data source 1162 and control information (e.g., ACK/NACK, CSI, etc.) from controller/processor 1180. Processor 1164 may also generate reference symbols for one or more reference signals. The symbols from transmit processor 1164 may be precoded by a TX MIMO processor 1166 if applicable, further processed by modulators 1154*a* through 1154*r* (e.g., for SC-FDM, OFDM, etc.), and transmitted to base station 110*y*. At base station 110*y*, the uplink signals from UE 120*y* and other UEs may be received by antennas 1134, processed by demodulators 1132, detected by a MIMO detector 1136 if applicable, and further processed by a receive processor 1138 to obtain decoded data and control information sent by UE 120*y* and other UEs. Processor 1138 may provide the decoded data to a data sink 1139 and the decoded control information to controller/processor 1140.

Controllers/processors 1140 and 1180 may direct the operation at base station 110*y* and UE 120*y*, respectively. Processor 1180 and/or other processors and modules at UE 120*y* may perform or direct process 600 in FIG. 6, process 800 in FIG. 8, and/or other processes for the techniques described herein. Processor 1140 and/or other processors and modules at base station 110*y* may perform or direct process 700 in FIG. 7, process 900 in FIG. 9, and/or other processes for the techniques described herein. Memories 1142 and 1182 may store data and program codes for base station 110*y* and UE 120*y*, respectively. A scheduler 1144 may schedule UEs for data transmissions on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    determining a current configuration for concurrent transmission of a control channel and a shared channel by a user equipment (UE);
    determining whether the UE is scheduled for data transmission in a subframe;
    determining a type of control information to be sent in the subframe;
    selecting one or more channels, from among the control channel and the shared channel, to send control information in the subframe based on the type of the control information, the current configuration for concurrent transmission of the control channel and the shared channel, and whether the UE is scheduled for transmission in the subframe; and
    sending the control information on the one or more channels in the subframe, wherein a first type of control information is sent on the shared channel and a second type of control information is sent on the control channel when both the control channel and the shared channel are selected, the first and second types of control information being sent concurrently.

2. The method of claim 1, wherein the selecting one or more channels comprises selecting the one or more channels based further on whether the UE is scheduled for data transmission on the shared channel in the subframe.

3. The method of claim 2, wherein the selecting one or more channels comprises selecting the control channel to send the control information based on a determination that the UE is not scheduled for data transmission on the shared channel in the subframe.

4. The method of claim 1, wherein the selecting one or more channels comprises selecting the one or more channels based further on whether the UE has sufficient transmit power to transmit both the control channel and the shared channel in the subframe.

5. The method of claim 1, wherein the control information comprises acknowledgement/negative acknowledgement (ACK/NACK) bits and channel state information (CSI).

6. The method of claim 5, wherein the selecting the one or more channels comprises selecting the control channel to send the ACK/NACK bits and the shared channel to send the CSI based on a determination that the current configuration permits concurrent transmission of the control channel and the shared channel.

7. The method of claim 6, wherein the sending the control information comprises sending the ACK/NACK bits on the control channel and the CSI on the shared channel on a single uplink carrier.

8. The method of claim 6, wherein the sending the control information comprises:

sending the ACK/NACK bits on the control channel on a first uplink carrier; and sending the CSI on the shared channel on a second uplink carrier.

9. The method of claim 5, wherein the selecting the one or more channels comprises selecting the one more channels based further on a current configuration for simultaneous transmission of the ACK/NACK bits and the CSI by the UE.

10. The method of claim 9, wherein the selecting the one or more channels comprises selecting the control channel to send the ACK/NACK bits and the shared channel to send the CSI.

11. The method of claim 5, wherein the selecting the one or more channels comprises selecting the control channel to send the ACK/NACK bits and the shared channel to send the CSI based further on a number of the ACK/NACK bits to send.

12. The method of claim 5, wherein the selecting the one or more channels comprises selecting a first control channel to send the ACK/NACK bits and a second control channel to send the CSI.

13. The method of claim 5, wherein the sending the control information comprises:

sending the ACK/NACK bits on the control channel via a first antenna of the UE; and sending the CSI on the control channel via a second antenna of the UE.

14. The method of claim 1, wherein the control information comprises only acknowledgement/negative acknowledgement (ACK/NACK) bits, and wherein the selecting the one or more channels comprises selecting the control channel to send the ACK/NACK bits.

15. The method of claim 1, wherein the control information comprises only channel state information (CSI), and wherein the selecting the one or more channels comprises selecting the control channel to send the CSI.

16. A method for wireless communication, comprising:

determining a current configuration for concurrent transmission of a control channel and a shared channel by a user equipment (UE);

selecting one or more channels, from among the control channel and the shared channel, to send control information in a subframe based on a type of the control information and the current configuration for concurrent transmission of the control channel and the shared channel, wherein the control information comprises a first type of control information with a first priority and a second type of control information with a second priority lower than the first priority, and wherein the selecting one or more channels comprises selecting the control channel to send the first type of control information and the shared channel to send the second type of control information; and sending the control information on the one or more channels in the subframe.

17. A method for wireless communication comprising:

sending a power headroom report by a user equipment (UE);

determining a current configuration for concurrent transmission of a control channel and a shared channel by the UE, the determining the current configuration comprising receiving signaling indicating the current configuration for concurrent transmission of the control channel and the shared channel by the UE, the current configuration being based on the information from the power headroom report;

selecting one or more channels, from among the control channel and the shared channel, to send control information in a subframe based on a type of the control information and the current configuration for concurrent transmission of the control channel and the shared channel; and sending the control information on the one or more channels in the subframe.

18. An apparatus for wireless communication, comprising:

means for determining a current configuration for concurrent transmission of a control channel and a shared channel by a user equipment (UE);

means for determining whether the UE is scheduled for data transmission in a subframe;

means for determining a type of control information to be sent in the subframe;

means for selecting one or more channels, from among the control channel and the shared channel, to send control information in the subframe based on the type of the control information, the current configuration for concurrent transmission of the control channel and the shared channel, and whether the UE is scheduled for transmission in the subframe; and means for sending the control information on the one or more channels in the subframe, wherein a first type of control information is sent on the shared channel and a second type of control information is sent on the control channel when both the control channel and the shared channel are selected, the first and second types of control information being sent concurrently.

19. The apparatus of claim 18, wherein the means for selecting one or more channels comprises means for selecting the one or more channels based further on whether the UE is scheduled for data transmission on the shared channel in the subframe.

20. The apparatus of claim 18, wherein the means for selecting one or more channels comprises means for selecting the one or more channels based further on whether the UE has sufficient transmit power to transmit both the control channel and the shared channel in the subframe.

21. The apparatus of claim 18, wherein the control information comprises acknowledgement/negative acknowledgement (ACK/NACK) bits and channel state information (CSI), and wherein the means for selecting the one or more channels comprises means for selecting the one more channels based further on a current configuration for simultaneous transmission of the ACK/NACK bits and the CSI by the UE.

22. The apparatus of claim 18, wherein the control information comprises acknowledgement/negative acknowledgement (ACK/NACK) bits, and wherein the means for selecting the one or more channels comprises means for selecting the one more channels based further on a number of bits of the ACK/NACK bits.

23. An apparatus for wireless communication, comprising:

at least one processor configured to:

determine a current configuration for concurrent transmission of a control channel and a shared channel by a user equipment (UE);

determine whether the UE is scheduled for data transmission in a subframe;

determine a type of control information to be sent in the subframe;

select one or more channels, from among the control channel and the shared channel, to send control information in the subframe based on the type of the control information, the current configuration for concurrent transmission of the control channel and the shared channel, and whether the UE is scheduled for transmission in the subframe; and send the control information on the one or more channels in the subframe, wherein a first type of control information is sent on the shared channel and a second type of control information is sent on the control channel when both the control channel and the shared channel are selected, the first and second types of control information being sent concurrently; and a memory coupled to the at least one processor.

24. The apparatus of claim 23, wherein the at least one processor is configured to select the one or more channels based further on whether the UE is scheduled for data transmission on the shared channel in the subframe.

25. The apparatus of claim 23, wherein the at least one processor is configured to select the one or more channels based further on whether the UE has sufficient transmit power to transmit both the control channel and the shared channel in the subframe.

26. The apparatus of claim 23, wherein the control information comprises acknowledgement/negative acknowledgement (ACK/NACK) bits and channel state information (CSI), and wherein the at least one processor is configured to select the one more channels based further on a current configuration for simultaneous transmission of the ACK/NACK bits and the CSI by the UE.

27. The apparatus of claim 23, wherein the control information comprises acknowledgement/negative acknowledgement (ACK/NACK) bits, and wherein the at least one processor is configured to select the one more channels based further on a number of the ACK/NACK bits to send.

28. A computer program product, comprising:
a non-transitory computer-readable medium storing instructions which when executed by at least one processor causes the at least one processor to perform the steps of:

determining a current configuration for concurrent transmission of a control channel and a shared channel by a user equipment (UE), determining whether the UE is scheduled for data transmission in a subframe, determining a type of control information to be sent in the subframe, selecting one or more channels, from among the control channel and the shared channel, to send control information in the subframe based on the type of the control information, the current configuration for concurrent transmission of the control channel and the shared channel, and whether the UE is scheduled for transmission in the subframe, and sending the control information on the one or more channels in the subframe, wherein a first type of control information is sent on the shared channel and a second type of control information is sent on the control channel when both the control channel and the shared channel are selected, the first and second types of control information being sent concurrently.

* * * * *